United States Patent [19]

Tengel et al.

[11] Patent Number: 5,940,812
[45] Date of Patent: Aug. 17, 1999

[54] APPARATUS AND METHOD FOR AUTOMATICALLY MATCHING A BEST AVAILABLE LOAN TO A POTENTIAL BORROWER VIA GLOBAL TELECOMMUNICATIONS NETWORK

[75] Inventors: Cary G. Tengel, Chicago, Ill.; Thomas A. Farin, Madison, Wis.; Michael L. Kowal, Oak Park, Ill.; L. Darryl Mataya, Mt. Horeb, Wis.

[73] Assignee: LoanMarket Resources, L.L.C., Chicago, Ill.

[21] Appl. No.: 08/914,633

[22] Filed: Aug. 19, 1997

[51] Int. Cl.⁶ .................................... G06F 17/60
[52] U.S. Cl. ................ 705/38; 395/238; 364/408
[58] Field of Search .............. 705/38; 395/238; 364/408

[56] References Cited

U.S. PATENT DOCUMENTS

| | | | |
|---|---|---|---|
| 5,239,462 | 8/1993 | Jones et al. | 364/408 |
| 5,274,547 | 12/1993 | Zoffel et al. | 364/408 |
| 5,611,052 | 3/1997 | Dykstra et al. | 395/238 |
| 5,704,045 | 12/1997 | King et al. | 395/235 |
| 5,765,144 | 6/1998 | Larche et al. | 705/38 |
| 5,797,133 | 8/1998 | Jones et al. | 705/38 |

OTHER PUBLICATIONS

Document No. 1006–3425, 1997, Ho Geun Lee.
Document No. 1060–3425/98, 1998, Hans U. Buhl.
Document No. 0–7803–4391–3/98, 1998, Subbarao V. Wunnava.

*Primary Examiner*—Kevin J. Teska
*Assistant Examiner*—Mark J. Fink
*Attorney, Agent, or Firm*—McDonnell Boehnen Hulbert & Berghoff

[57] ABSTRACT

A loan origination system including an apparatus and method for automatically matching a best available loan to a potential borrower, via a global telecommunications network. The loan origination system of the present invention brings together via the global telecommunications network potential borrowers and lenders. The loan origination system accepts and stores into a database borrower attributes entered by a potential borrower requesting a loan, via the global telecommunications network. The loan origination system also accepts and stores into the database credit related information regarding the potential borrower sent from at least one credit bureau. The loan origination system stores into the database respective loan acceptance criteria and respective loan attributes for an offered loan. The loan origination system compares the borrower attributes of the potential borrower with all of the loan acceptance criteria stored in the database to determine any available loans for the potential borrower. The loan attributes of the available loans are analyzed to determine rankings of best loans. From the rankings of best loans, the borrower chooses a selected loan provided by a selected lender. A loan application is automatically generated from the borrower attributes and is automatically sent to the selected lender for loan approval. In addition, the loan origination system of the present invention provides to a lender information regarding borrowers and/or other competitive lenders in the loan market.

48 Claims, 12 Drawing Sheets

| LENDER ACCEPTANCE CRITERIA 300 | | | | | |
|---|---|---|---|---|---|
| LENDER CRITERIA GROUP | BORROWER ATTRIBUTE | MIN VALUE | MAX VALUE | MENU | |
| PRODUCT | 1. PRODUCT TYPE | | | X | ←301 |
| GEOGRAPHY | 2. TRADE AREA | | | X | ←302 |
| DEMOGRAPHICS | 3. YEARS IN CURRENT RESIDENCE | X | X | | ←303 |
| | 4. REQUIRED TO OWN HOME | | | X | ←304 |
| | 5. YEARS WITH PRESENT EMPLOYER | X | X | | ←305 |
| | 6. PERMITTED TO BE SELF-EMPLOYED | | | X | ←306 |
| | 7. GROSS MONTHLY INCOME | X | X | | ←307 |
| | 8. DEBT/INCOME RATIO | X | X | | ←308 |
| CREDIT LIMIT | 9. CREDIT LIMIT | X | X | | ←309 |
| | 10. CLTV | X | X | | ←310 |
| CREDIT UTILIZATION | 11. NUMBER OF OPEN TRADES | X | X | | ←311 |
| | 12. AGE OF OLDEST TRADE | X | X | | ←312 |
| | 13. AGGREGATE UTILIZATION % | X | X | | ←313 |
| PAYMENT PERFORMANCE | 14. CURRENT MORTGAGE DELINQUENCY | X | X | | ←314 |
| | 15. CURRENT NON-MORTGAGE DELINQUENCY | X | X | | ←315 |
| | 16. # OF 30-DAY MORTGAGE DELINQUENCIES IN PAST 24 MONTHS | X | X | | ←316 |

FIG. 3A

| | | | | |
|---|---|---|---|---|
| PAYMENT PERFORMANCE (CON'T) | 17. # OF 30-DAY NON-MORTGAGE DELINQUENCIES IN PAST 24 MONTHS | X | X | |
| | 18. # OF 60-DAY MORTGAGE DELINQUENCIES IN PAST 24 MONTHS | X | X | |
| | 19. # OF 60-DAY NON-MORTGAGE DELINQUENCIES IN PAST 24 MONTHS | X | X | |
| | 20. # OF 90-DAY MORTGAGE DELINQUENCIES IN PAST 24 MONTHS | X | X | |
| | 21. # OF 90-DAY NON-MORTGAGE DELINQUENCIES IN PAST 24 MONTHS | X | X | |
| JUDGMENTS | 22. # OF CHARGE-OFFS > $250 IN THE PAST 24 MONTHS | X | X | |
| | 23. ANY FORECLOSURE, BANKRUPTCY, OR LEGAL PROCEEDINGS? | | | X |
| | 24. YEARS SINCE RESOLUTION OF BANKRUPTCY | X | X | |
| COLLATERAL | 25. LIEN POSITION | X | X | |
| | 26. CURRENT MARKET VALUE | X | X | |
| | 27. DISTRIBUTION OF PROCEEDS | | | X |
| | 28. USE OF PROPERTY | | | X |
| | 29. AGE OF COLLATERAL | X | X | |
| CREDIT SCORE | 30. FICO SCORE | X | X | |

FIG. 3B

400 — LOAN ATTRIBUTES — 450

| LOAN ATTRIBUTE | LENDER'S BID | |
|---|---|---|
| 1. BID IDENTIFICATION NUMBER | | 401 |
| 2. BORROWER ATTRIBUTES IDENTIFICATION NUMBER | | 402 |
| 3. ANNUAL PERCENTAGE RATE (APR) | | 403 |
| 4. INTEREST RATE | | 404 |
| 5. FIXED/ADJUSTS WITH: | | 405 |
| 6. MARGIN OVER INDEX | | 406 |
| 7. ADJUSTMENT INTERVAL | | 407 |
| 8. ORIGINATION FEE | | 408 |
| 9. NON-ORIGINATION FEE CLOSING COSTS | | 409 |
| 10. ANNUAL FEE | | 410 |
| 11. MAXIMUM LOAN TERM (YEARS) | | 411 |
| 12. FULL AMORTIZATION MONTHLY PAYMENT FOR EVERY $1,000 BORROWED. | | 412 |
| 13. MINIMUM MONTHLY PAYMENT FOR $1,000 BORROWED. | | 413 |
| 14. OTHER UNIQUE ATTRIBUTES. | | 414 |

500 — LOAN APPLICATION FORM

PLEASE PROVIDE ALL THE REQUESTED INFORMATION. WHEN YOU HAVE COMPLETED THE FORM, PRESS THE SUBMIT BUTTON TO SEND YOUR APPLICATION FOR PROCESSING.

LOAN TYPE (MORTGAGE, EQUITY, AUTO, BUSINESS, ETC.):_____
PRIMARY APPLICANT: LAST NAME:_____    FIRST NAME::_____

SOCIAL SECURITY NUMBER:_____    DATE OF BIRTH:_____

ADDRESS:_____          HOME PHONE NUMBER:_____
_____                  YEARS IN CURRENT RESIDENCE:_____
CITY,   STATE,   ZIP CODE           OWN HOME (Y/N):_____

EMPLOYER NAME:_____            EMPLOYER PHONE NUMBER:_____
JOB START DATE (MONTH/YEAR):_____  JOB TITLE:_____
SELF-EMPLOYED (Y/N):_____        GROSS INCOME:_____
                                              MONTHLY AND ANNUAL
OTHER INCOME:_____

DEBTS MONTHLY PAYMENT:
1. _____      2. _____
3. _____      4. _____
5. _____      6. _____

(IN ADDITION TO RENT/MORTGAGE LIST ALL OTHER DEBTS, FOR EXAMPLE, AUTO LOANS, CREDIT CARDS, SECOND MORTGAGE, HOME ASSOCIATION DUES, ALIMONY, CHILD SUPPORT, CHILD CARE, MEDICAL UTILITIES, AUTO INSURANCE, IRS LIABILITIES, ETC.)

JOINT APPLICANT (IF ANY): LAST NAME:_____    FIRST NAME:_____

SOCIAL SECURITY NUMBER:_____    DATE OF BIRTH:_____

COMMENTS:_____
_____

BY SUBMITTING THIS APPLICATION, I/WE GIVE PERMISSION TO USE CREDIT REPORTING AGENCIES FOR FURTHER INFORMATION. I/WE CERTIFY THAT STATEMENTS ON THIS APPLICATION ARE TRUE AND COMPLETE.

[ SUBMIT ] — 502

FIG. 5

RANKING OF BEST AVAILABLE LOANS

| LOAN ATTRIBUTE | LOWEST APR | LOWEST CURRENT INTEREST RATE | LOWEST FIXED INTEREST RATE | LOWEST TOTAL ORIGINATION COST | HIGHEST CREDIT LIMIT | LOWEST MINIMUM MONTHLY PAYMENT | HIGHEST WEIGHTED SCORE |
|---|---|---|---|---|---|---|---|
| BID ID# | | | | | | | |
| APR | | | | | | | |
| INTEREST RATE | | | | | | | |
| FIXED/ADJUST WITH: | | | | | | | |
| MARGIN OVER INDEX | | | | | | | |
| ORIGINATION FEE | | | | | | | |
| CLOSING COSTS | | | | | | | |
| ANNUAL FEE | | | | | | | |
| MAXIMUM LOAN TERM | | | | | | | |
| FULL AMORT. MONTHLY PAYMENT FOR EVERY $1,000 LOAN | | | | | | | |
| MINIMUM MONTHLY PAYMENT FOR EVERY $1,000 LOAN | | | | | | | |
| OTHER UNIQUE ATTRIBUTES | | | | | | | |

SELECTED LENDER (700)

LENDER NAME: _____
LENDER PHONE NUMBER: _____
LENDER ADDRESS: _____
LENDER CONTACT NAME: _____

| LOAN ATTRIBUTE | LENDER'S BID |
|---|---|
| 1. BID IDENTIFICATION NUMBER | |
| 2. BORROWER ATTRIBUTES IDENTIFICATION NUMBER | |
| 3. ANNUAL PERCENTAGE RATE (APR) | |
| 4. INTEREST RATE | |
| 5. FIXED/ADJUSTS WITH: | |
| 6. MARGIN OVER INDEX | |
| 7. ADJUSTMENT INTERVAL | |
| 8. ORIGINATION FEE | |
| 9. NON-ORIGINATION FEE CLOSING COSTS | |
| 10. ANNUAL FEE | |
| 11. MAXIMUM LOAN TERM (YEARS) | |
| 12. FULL AMORTIZATION MONTHLY PAYMENT FOR EVERY $1,000 BORROWED. | |
| 13. MINIMUM MONTHLY PAYMENT FOR $1,000 BORROWED. | |
| 14. OTHER UNIQUE ATTRIBUTES | |

SHOULD A LOAN APPLICATION BE SUBMITTED TO THIS LENDER? (PLEASE ENTER "Y" FOR YES AND "N" FOR NO.)
702

| APPLICATIONS IN LINE | | | |
|---|---|---|---|
| LOAN ID# | 1 | 2 | 3 |
| POSTED DATE | | | |
| FINAL DISPOSITION | | | |
| EXPLANATION FOR DENIAL OR CHANGE OF TERMS | | | |
| 1. BID IDENTIFICATION NUMBER | | | |
| 2. BORROWER ATTRIBUTES IDENTIFICATION NUMBER | | | |
| 3. ANNUAL PERCENTAGE RATE (APR) | | | |
| 4. INTEREST RATE | | | |
| 5. FIXED/ADJUSTS WITH: | | | |
| 6. MARGIN OVER INDEX | | | |
| 7. ADJUSTMENT INTERVAL | | | |
| 8. ORIGINATION FEE | | | |
| 9. NON-ORIGINATION FEE CLOSING COSTS | | | |
| 10. ANNUAL FEE | | | |
| 11. MAXIMUM LOAN TERM (YEARS) | | | |
| 12. FULL AMORTIZATION MONTHLY PAYMENT FOR EVERY $1,000 BORROWED. | | | |
| 13. MINIMUM MONTHLY PAYMENT FOR $1,000 BORROWED. | | | |
| 14. OTHER UNIQUE ATTRIBUTES | | | |

FIG. 8

PERFORMANCE CHARACTERISTICS FOR SPECIFIED LENDER ACCEPTANCE CRITERIA # ____
FOR LOANS ORIGINATED FROM DATE ____ TO DATE _____:

| PERFORMANCE CHARACTERISTIC | NUMBER OF LOANS | $ VALUE OF LOANS |
|---|---|---|
| % LOAN REMAINING | | |
| % DELINQUENT FOR 30 DAYS | | |
| % DELINQUENT FOR 60 DAYS | | |
| % DELINQUENT FOR 90+ DAYS | | |
| % CHARGED-OFF | | |

FIG. 10

APPARATUS AND METHOD FOR AUTOMATICALLY MATCHING A BEST AVAILABLE LOAN TO A POTENTIAL BORROWER VIA GLOBAL TELECOMMUNICATIONS NETWORK

TECHNICAL FIELD

This invention relates to loan origination systems, and more particularly, to an apparatus and method for automatically matching a best available loan to a potential borrower given the particular attributes of that borrower, via a global telecommunications network.

BACKGROUND OF THE INVENTION

In the prior art, a potential borrower who needs a loan typically either searches various lender advertisements for information, searches interest rate listing services, contacts a number of lenders to request information or simply applies for a loan without comparison shopping. Lenders typically present their loans with the best terms in advertisements, which may not be the loan for which the potential borrower would be able to qualify.

Rate listing services are of limited value as they generally do not present a comprehensive description of loan features, pricing, terms, and conditions. Furthermore, the published rates do not consider the attributes, including the risk profile of the respective borrower. The services generally publish the lender's best rate, for which the potential borrower may not qualify.

Alternatively, contacting directly a number of lenders typically requires the potential borrower to go through a tedious process of contacting each lender and of manually filling out loan applications. The potential borrower wastes much time and effort in either traveling to the lender or in having the lender send information and application forms. The required time and effort in searching for available loans and in filling out loan applications acts as a barrier to the borrower for acquiring a maximum amount of information about loans in the loan market, and even about loans available from an individual lender. Although the automated loan processing system disclosed in U.S. Pat. No. 5,611,052 to Dykstra et al. provides automation to the lender for approving or disapproving loan applications, such a system does not automatically determine a best available loan for a potential borrower.

The worst case for the borrower occurs when he or she obtains a loan without comparison shopping. This is the result of the borrower having insufficient time to search for information or limited confidence in his or her ability to analyze loan terms when selecting a loan. Searching without comparison shopping is generally the way potential borrowers with limited financial sophistication obtain loans. This failure to comparison shop often results in the potential borrower contracting to pay a higher interest rate or accepting less favorable terms than possible with comparison shopping.

Furthermore, in the prior art, lenders typically are able to establish and maintain one or only a few set of general loan acceptance criteria. A single set of loan pricing and terms is offered to all borrowers who satisfy this criteria. Offering such a limited number of loans requires that all borrowers, within such an unsegmented population of borrowers, be offered an interest rate and terms that are appropriate for the average borrower within that population. Thus, borrowers with below average attributes will be offered interest rates and terms that are too favorable based upon their default risk, prepayment risk and other attributes, which therefore will result in an unprofitable loan for the lender. Borrowers with above average attributes will be offered loans that are too unfavorable relative to their attributes. In the prior art, lenders are unable to establish and maintain a sufficient number of loans with corresponding loan acceptance criteria to allow them to precisely scale and match loan attributes to the borrower's attributes.

Furthermore, a lender with the prior art loan origination procedure may not have access to information about loan terms provided by other competitive lenders to borrowers having similar qualifications. Thus, a lender may waste time and resources in establishing and offering uncompetitive loan terms.

Consequently, a loan origination system is desired that automatically matches any potential borrower to the best available loan and that aids in easy access to information about the loan market for both potential borrowers and lenders. With such an improved loan origination system, any potential borrower can have fast and efficient access to a best available loan, and the lender can offer more accurate and competitive loan terms to a potential borrower having a corresponding set of borrower attributes.

SUMMARY OF THE INVENTION

Accordingly, it is a primary object of the invention is to more efficiently and effectively match a best available loan against borrower attributes of a potential borrower using a global telecommunications network such as the Internet. More specifically, a database accumulates information regarding potential borrowers and potentially available loans in the loan market, and provides easy access to such information for both potential borrowers and lenders.

In a general aspect of the present invention, a consumer terminal, coupled to the global telecommunications network, accepts a first portion of borrower attributes entered by the potential borrower into the consumer terminal. Furthermore, a server terminal is coupled to the global telecommunications network and includes a database and a processor. The database stores the first portion of the borrower attributes sent to the server terminal by the consumer terminal and stores a second portion of the borrower attributes provided by a credit bureau. The database also stores a respective loan acceptance criteria and respective loan attributes for each loan that is potentially available to the potential borrower. The data processor compares the borrower attributes with each of the respective loan acceptance criteria stored in the database to determine any available loans for the potential borrower. The database also determines a ranking of best loans among the available loans depending on the respective loan attributes of each available loan.

The present invention can be used to particular advantage when the server terminal is located with one lender, and each of the at least one potentially available loan is offered by the one lender. Alternatively, the server terminal is located with an affiliation of lenders, and each of the at least one potentially available loan is offered by the affiliation of lenders.

In another aspect of the present invention, a respective lender terminal, for each of a plurality of lenders, is coupled to the global telecommunications network. The respective lender terminal accepts a respective loan acceptance criteria and respective loan attributes for each loan provided by each of the lenders. The respective lender terminal also sends the respective loan acceptance criteria and the respective loan attributes to the database via the global telecommunications network.

The ranking of best loans may be determined for each loan attribute such as interest rate or origination fee, or this ranking may be determined from calculating a respective composite score from a weighting of the respective loan attributes for each available loan. The weighting of loan attributes may include a respective weighting factor for each loan attribute that is a predetermined default value or a respective weighting factor that is selected by the potential borrower for each loan attribute.

In addition, the present invention may include a web-page that may be downloaded to the consumer terminal for allowing entry of the first portion of the borrower attributes by the potential borrower. A second portion of the set of borrower attributes may be provided by at least one credit bureau via a credit bureau interface disposed on the server terminal.

In a further aspect of the present invention, the ranking of best loans is displayed to the potential borrower on a screen of the consumer terminal via the global telecommunications network.

In another aspect of the present invention, the potential borrower chooses a selected loan provided by a selected lender from the ranking of best loans. The data processor then generates a loan application from the borrower attributes, and sends the loan application via the global telecommunications network to the selected lender for loan approval.

The present invention is used to particular advantage by a lender when the present invention sends information via the global telecommunications network to the lender regarding borrower performance for specified loan acceptance criteria. In this aspect, the present invention accepts the specified loan acceptance criteria from the lender. At least one credit bureau is contacted to send performance data of already existing loans having borrowers with this specified loan acceptance criteria. Specified borrower performance characteristics are calculated and provided to the lender requesting such information.

Moreover, the present invention provides a lender information regarding loans provided by other lenders also having similar loan acceptance criteria. Thus, a lender is informed of competitive rates in the loan market as provided by other lenders.

These and other features and advantages of the present invention will be better understood by considering the following detailed description of the invention which is presented with the attached drawings.

BRIEF DESCRIPTION OF THE DRAWINGS

FIG. 2, including

FIG. 3, including FIG. 3A and FIG. 3B, shows a table of loan acceptance criteria;

FIG. 4 shows a table of loan attributes;

FIG. 5 shows a borrower loan application form that a potential borrower fills out and sends via the global telecommunications network;

FIG. 6 shows a ranking of best available loans for a potential borrower;

FIG. 7 shows a display of information regarding a selected loan that the potential borrower has chosen from the ranking of best loans;

FIG. 8 shows a display of loan applications in queue for a particular lender;

FIG. 10 shows a display of performance data for existing loans having borrowers with specified loan acceptance criteria.

DETAILED DESCRIPTION OF THE PREFERRED EMBODIMENT

The following terms have these corresponding definitions in the description:

AFFILIATION OF LENDERS: A group of lenders, such as branches of a bank, banks within a bank holding company, or other lending entities under common ownership or sharing some other association.

AVAILABLE LOAN: A loan that a lender will offer to a potential borrower when the given attributes of that borrower satisfy the loan acceptance criteria.

BORROWER ATTRIBUTES: Information about a potential borrower contained within the borrower's loan application and credit report that a lender may use to estimate the borrower's default risk, prepayment risk, profitability, or other factors for determining the loan or loans that should be made available to the borrower.

LENDER: A bank, finance company, mortgage bank, or other entity in the business of originating loans.

LOAN: A complete set of loan attributes.

LOAN ACCEPTANCE CRITERIA: Attributes the lender requires to be possessed by a potential borrower in order to make a loan available to that borrower.

LOAN ATTRIBUTE: Each of the features, including pricing, credit limit, and terms associated with a loan.

OFFERED LOAN: A loan that a lender offers to a potential borrower.

PLURALITY OF LENDERS: A group of lenders that are not affiliated in any way other than in their participation in the loan market as competitors for loans.

SELECTED LOAN: An available loan selected by the potential borrower as possessing the best (i.e., most favorable or desirable to the borrower) attribute or combination of attributes relative to all other available loans.

Figure 1:
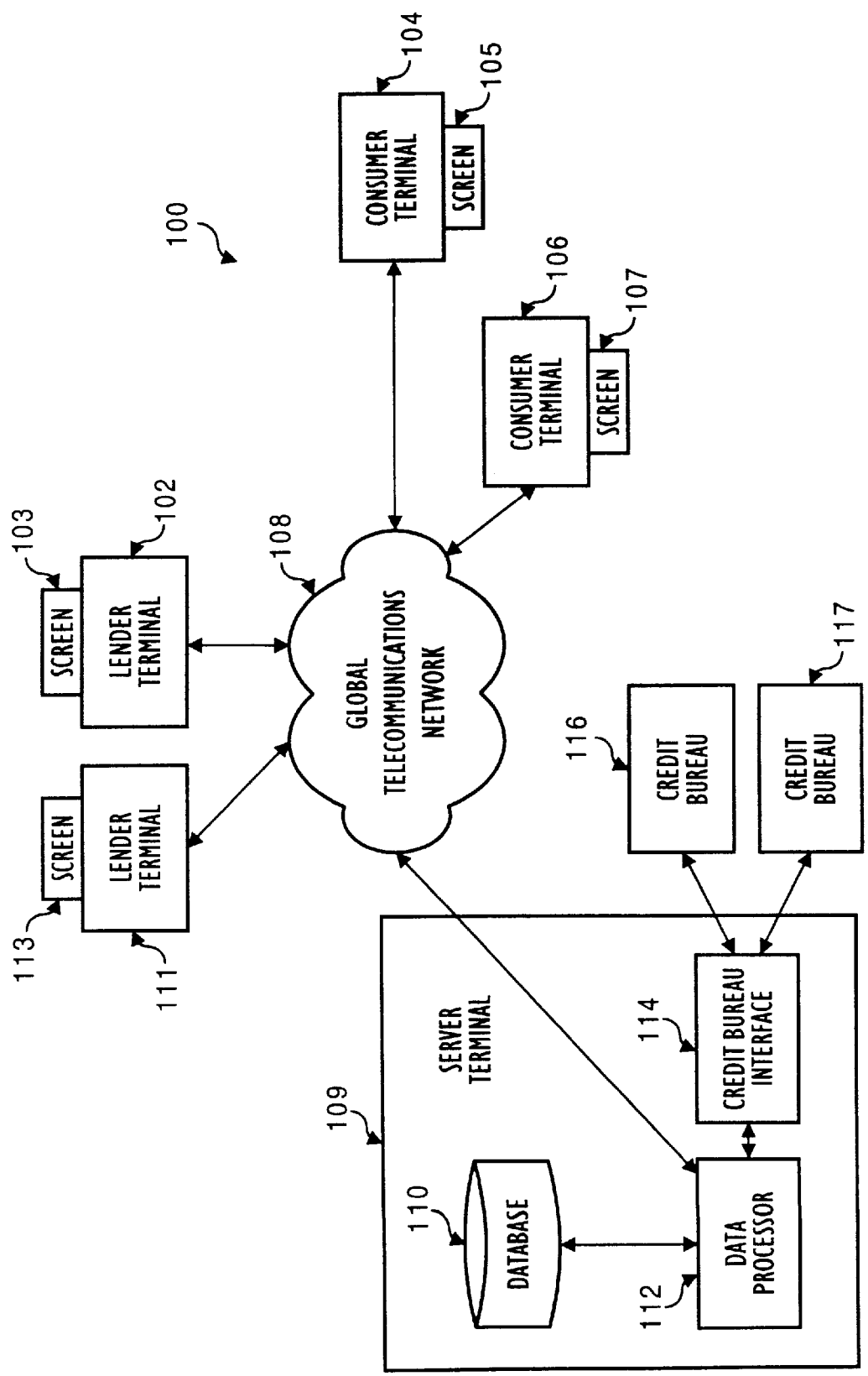
FIG. 1 shows a block diagram of a loan origination apparatus according to a preferred embodiment of the present invention.

Referring to FIG. 1, a loan origination apparatus of the present invention 100 may include a plurality of lender terminals including a first lender terminal 102 and a second lender terminal 111. The first lender terminal has a first lender screen 103, and the second lender terminal has a second lender screen 113. Each lender terminal is located with a lender using the loan origination apparatus.

The loan origination apparatus typically includes a plurality of consumer terminals including a first consumer terminal 104 and a second consumer terminal 106. The first consumer terminal has a first consumer screen 105, and the second consumer terminal has a second consumer screen 107. Each consumer terminal is located with a potential borrower using the loan origination apparatus in search of a loan. Alternatively, a consumer terminal may be located with a consumer service representative who would submit the borrower attribute data for a potential borrower who does not have access to the web page via the global telecommunications network.

The lender terminals and the consumer terminals are coupled to a global telecommunications network 108 which is the public access network for communication among remotely located computers. A common example of such a global telecommunications network is the Internet.

A server terminal 109 of the loan origination apparatus is also coupled to the global telecommunications network. This server terminal further includes a database 110 and a data processor 112 coupled to the database and the global telecommunications network. The server terminal also includes a credit bureau interface 114 which is coupled to the data processor. The credit bureau interface is also coupled to at least one credit bureau including a first credit bureau 116 and a second credit bureau 117.

Figure 2A:
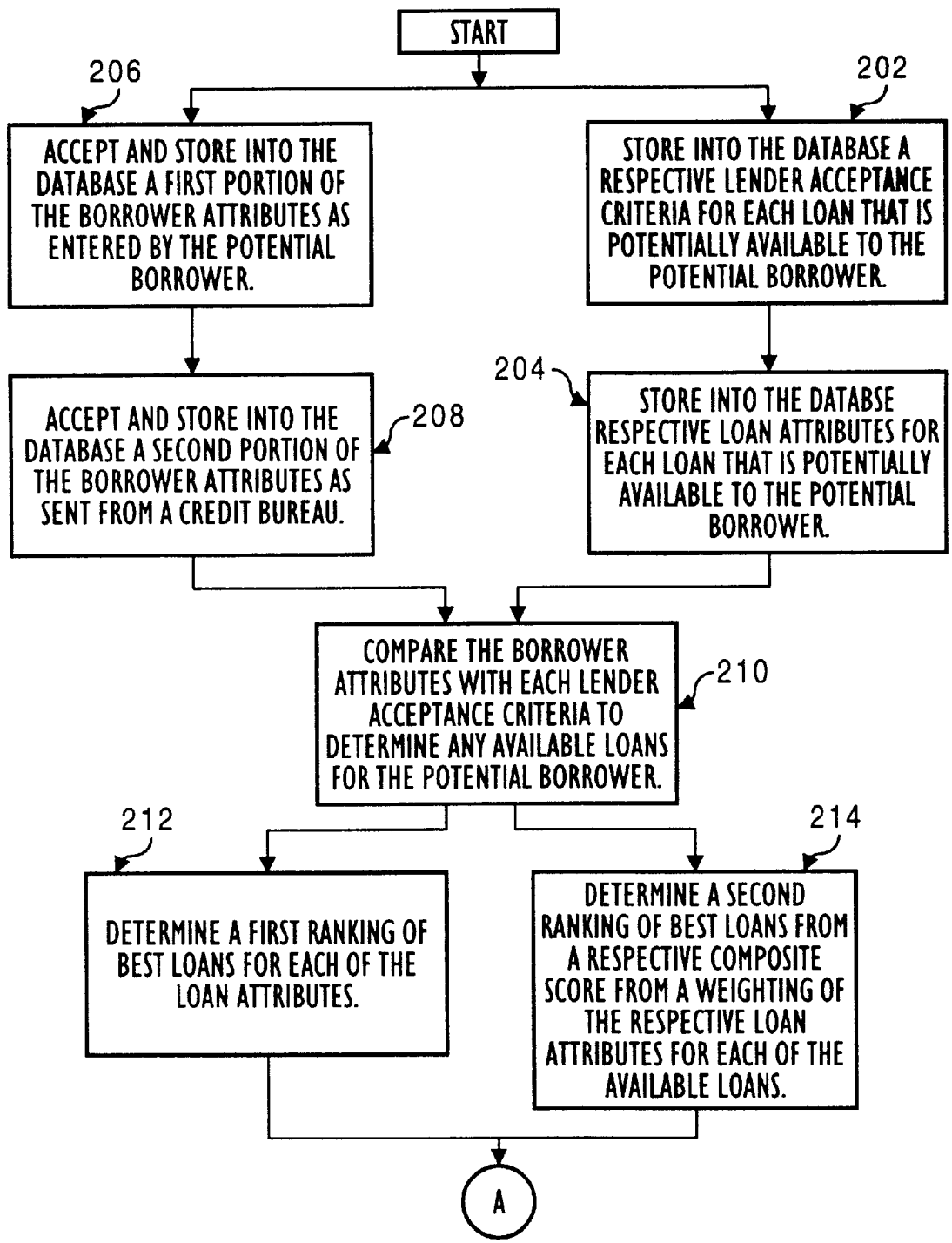
FIG. 2A and FIG. 2B, shows a flowchart of steps in the operation of the loan origination apparatus of FIG. 1.
Figure 2B:
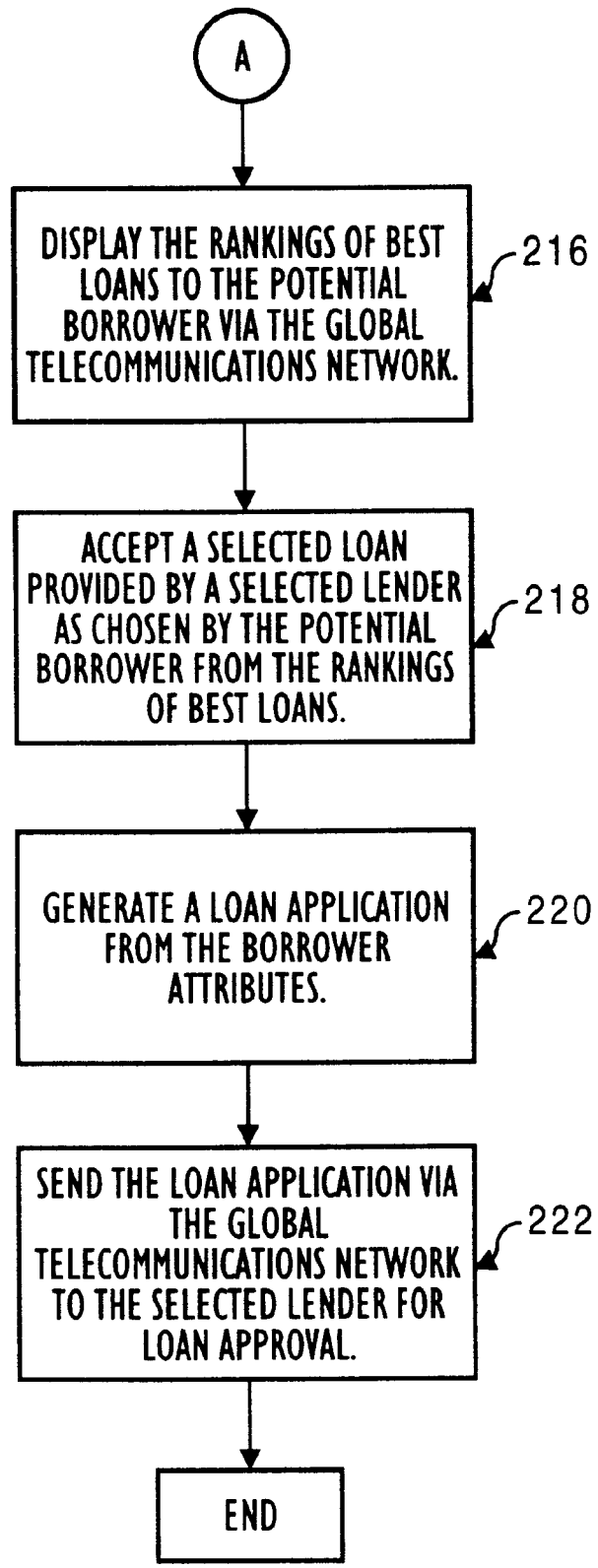

The operation of the loan origination apparatus 100 of FIG. 1 is now described with the flowcharts of FIG. 2A and FIG. 2B. This operation includes storing into the database 110 a respective loan acceptance criteria for any offered loan that is potentially available to a potential borrower (step 202). The respective loan acceptance criteria for an offered loan includes a specification of borrower attributes required to be possessed by the borrower to qualify for that loan.

Referring to FIGS. 3A and 3B, a table of loan acceptance criteria 300 is shown as displayed on a lender screen 350 of a lender terminal. Elements of the loan acceptance criteria include a "product type" entry 301 which specifies the type of the offered loan such as an auto, mortgage, or personal loan. A "trade area" entry 302 results from the lender specifying the geographic area for this offered loan. The lender for example may want to lend only to borrowers within the state of the lender's location.

A "current years in residence" entry 303 results from the lender specifying the allowed minimum and/or maximum years at the current residence. A "required to own home" entry 304 results from the lender specifying whether a borrower is required to own a home. A "years with present employer" entry 305 results from the lender specifying allowed minimum and/or maximum years with the present employer. A "permitted to be self-employed" entry 306 results from the lender specifying whether a borrower can be self-employed. A "gross monthly income" entry 307 results from the lender specifying allowed minimum and/or maximum gross monthly income. A "debt/income ratio" entry 308 results from the lender specifying allowed minimum and/or maximum ratio of the debt to income of a borrower. Loan acceptance criteria entries 303 through 308 are related to borrower demographics.

A "credit limit" entry 309 results from the lender specifying allowed minimum and/or maximum credit limit of a borrower. A "CLTV" entry 310 results from the lender specifying allowed minimum and/or maximum combined loan to value ratio for secured loans. Loan acceptance criteria entries 309 through 310 are related to credit limit information of the borrower.

A "number of open trades" entry 311 results from the lender specifying allowed minimum and/or maximum numbers of credit accounts open to the borrower. An "age of oldest trade" entry 312 results from the lender specifying allowed minimum and/or maximum age of the oldest credit account. An "aggregate utilization" entry 313 results from the lender specifying allowed minimum and/or maximum percentage of outstanding credit for the total credit limit available to the potential borrower. Loan acceptance criteria entries 311 through 313 are related to credit utilization of the potential borrower.

A "current mortgage delinquency" entry 314 results from the lender specifying allowed minimum and/or maximum total number of current mortgage delinquencies. A "current non-mortgage delinquency" entry 315 results from the lender specifying allowed minimum and/or maximum total number of current non-mortgage delinquencies. A "# of 30-day mortgage delinquencies in past 24 months" entry 316, "# of 30-day non-mortgage delinquencies in past 24 months" entry 317, "# of 60-day mortgage delinquencies in past 24 months" entry 318, "# of 60-day non-mortgage delinquencies in past 24 months" entry 319, "# of 90-day mortgage delinquencies in past 24 months" entry 320, "# of 90-day non-mortgage delinquencies in past 24 months" entry 321, all result from the lender specifying allowed minimum and/or maximum numbers of such delinquencies that a borrower is allowed to have to qualify for the offered loan. Loan acceptance criteria entries 314 through 321 are related to payment performance of a borrower.

A "# of charge-offs greater than $250 in the past 24 months" entry 322 results from the lender specifying the allowed minimum and/or maximum numbers of such charge-offs by a borrower. An "any judgments" entry 323 results from the lender specifying whether the borrower can have a foreclosure, bankruptcy, or other legal proceeding judgment. A "years since resolution of bankruptcy" entry 324 results from the lender specifying minimum and/or maximum years since resolution of any bankruptcy for a borrower. Loan acceptance criteria entries 322 through 324 are related to judgments involving a borrower.

A "lien position" entry 325 results from the lender specifying allowed minimum and/or maximum numbers of the lien position for a mortgage loan. A "current market value" entry 326 results from the lender specifying the allowed minimum and/or maximum current market value of the collateral of a borrower for a secured loan. A "distribution of proceeds" entry 327 results from the lender specifying whether the loaned money can be used as purchase money or for refinancing another loan. A "use of property" entry 328 results from the lender specifying whether the collateral in a secured loan can be used for personal or business use such as for an owner-occupied property vis a vis for a rental property. An "age of collateral" entry 329 results from the lender specifying allowed minimum and/or maximum age of the collateral in a secured loan. Loan acceptance criteria entries 325 through 329 are related to collateral of a borrower.

Finally, a proprietary credit score, such as a "FICO score," entry 330 results from the lender specifying an allowed minimum and/or maximum credit score of a borrower as typically derived from credit bureau data.

Lenders may specify loan acceptance criteria by defining minimum requirements for any or all elements making up the loan acceptance criteria. Alternatively, lenders may assign weighting factors to any or all of the elements making up the loan acceptance criteria and define an overall weighted score the potential borrower must satisfy. The weighting factor for each element reflects the importance of that element to the lender within the loan acceptance criteria. For example, a respective weighting factor may be multiplied into the corresponding element of the borrower attribute. Such weight multiplied elements may be summed to determine whether the total sum meets the overall weighted score the potential borrower must satisfy. The loan acceptance criteria may also be derived via other scoring models or from predefined risk classifications for any offered loan.

The lender terminal in the preferred embodiment of the present invention may be any PC running a Windows operating system or may be a Windows NT Workstation, with full Internet connectivity. The lender terminal may include a menu-driven interface written in Visual Basic for inputting data as the lender specifies the loan acceptance criteria for an offered loan. Alternatively, FIG. 3 shows the appearance of a form as displayed to the lender on the lender screen 350, enabling the user to enter data as prompted by the form and to thereafter submit the entered data for processing by the host data processor 112 of FIG. 1.

The form 300 of FIGS. 3A and 3B may be advantageously displayed as a web page by a conventional web browser based on an HTML (Hyper-Text Mark-up Language) form page transmitted to the lender terminal from the server processor 112. When the form is completed and submitted, the loan acceptance criteria entered on the form is then processed by the server processor 112 which executes a CGI (Common Gateway Interface) script or the like to place the loan acceptance criteria in the database 110 for future processing. The use of HTML and a web page for form display and data acceptance allows any lender to utilize available hardware and software to supply information to and obtain information from the system. One of ordinary skill in web technology can readily implement such a web page form.

This loan acceptance criteria is sent from a lender terminal via the global telecommunications network for storage in the database 110 of the server terminal 109. Note that a lender thus specifies any borrower attributes that a borrower must possess to qualify for that lender's offered loan. A lender using the loan origination apparatus of the present invention may submit a respective loan acceptance criteria for each loan offered by that lender. The database 110 stores all of the loan acceptance criteria sent from all lenders.

All of the loan acceptance criteria stored in the database 110 may be from a single lender offering a set of loans potentially available to a potential borrower. In that case, this single lender may control the server terminal 109, and the plurality of lender terminals 102 and 111 may not be necessary. Alternatively, all of the loan acceptance criteria stored in the database may be from an affiliation of lenders. Finally, the loan acceptance criteria stored in the database may be from a plurality of unrelated lenders who are competing to provide loans to potential borrowers.

Referring back to the flowchart of FIG. 2, the operation of the loan origination apparatus of the present invention also includes storing into the database 110 respective loan attributes for each offered loan that is potentially available to the potential borrower (step 204). Note that each offered loan then has a respective loan acceptance criteria and respective loan attributes stored in the database 110. The respective loan acceptance criteria and the respective loan attributes are related in that the respective loan attributes specify all of the terms for an offered loan to a potential borrower meeting the respective loan acceptance criteria.

Referring to FIG. 4, a table of loan attributes is shown on a lender screen 450 of a lender terminal. This table may be displayed as a web page in a similar manner as described for the form 300 of FIGS. 3A and 3B. Elements of loan attributes include a "bid identification number" item 401 which specifies an identification number for an offered loan. A "borrower attributes identification number" item 402 identifies any specific potential borrower who should consider this particular offered loan. An "APR" item 403 is the proposed effective annual percentage interest rate including all fees assessed to the potential borrower. An "interest rate" item 404 is the proposed interest rate excluding other fees. A "fixed or adjusts with:" item 405 specifies whether the loan is a fixed rate loan or an adjustable rate loan. A "margin over index" item 406 is the proposed margin over index interest rate in the case the loan is a variable interest loan. An "adjustment interval" item 407 is the proposed term for adjusting an adjustable interest rate.

An "origination fee" item 408 is the proposed origination fee for the loan. A "non-origination fee closing costs" item 409 is the proposed closing costs, exclusive of origination fee, that are common for mortgage loans. An "annual fee" item 410 is the proposed annual fee for the loan. A "maximum loan term" item 411 is the proposed maximum term for the loan. A "full amortization monthly payment for every $1,000 borrowed" item 412 specifies the monthly payment that must be made for every $1,000 borrowed if the loan were to be fully amortized for the specified "maximum loan term" item 411 and given the "interest rate" item 403. A "minimum monthly payment for every $1,000 borrowed" entry 413 specifies a minimum monthly payment that may be made for a balloon payment in the end of the loan term. An "other unique attributes" entry 414 specifies any other characteristics of this particular loan. For example, the lender may be giving away a free trip to Las Vegas with this loan.

A lender who provides an offered loan specifies the respective loan attributes and the respective loan acceptance criteria corresponding to that offered loan. The lender ensures that such loan attributes and loan acceptance criteria are stored in the database 110 for consideration by the loan origination apparatus. In addition, the lender may periodically update the respective loan attributes and the respective loan acceptance criteria as stored in the database 110 for any offered loan.

In this manner, the database 110 has accumulated information comprising loan attributes and loan acceptance criteria for all loans potentially available to any potential borrower. Referring back to FIG. 2, a potential borrower in search of a loan enters a first portion of borrower attributes via a consumer terminal (step 206). The consumer terminal may be a PC that supports Internet Explorer or Netscape Navigator for access to the global telecommunications network 108.

When the global telecommunications network 108 is the Internet, the borrower may download to a consumer terminal a web-page that includes a borrower loan application form 500 of FIG. 5. This loan application form is implemented in a similar manner as described for form 300 of FIGS. 3A and 3B and may use Microsoft Active Server Page technology including scripts written in Visual Basic or Java Script. Java, Javascript, or Active X form may also be used with suitably capable web browsers, and provide the added ability to perform validity checks on the data at the client terminal before it is sent to the server. These trade names are commonly known to those of ordinary skill in web technology.

This loan application form asks the potential borrower to enter various information about the borrower such as the loan product the borrower is applying for, the gross income of the borrower, current monthly debt payments by the borrower, and so on. Once the potential borrower has completed this loan application form, the potential borrower then clicks on the "SUBMIT" icon 502 to send the application to the database 110 via the global telecommunication network 108.

The information entered in the loan application form 500 comprises a first portion of the borrower attributes. If the potential borrower needs to come back to the loan application form in order to complete the form, the borrower may retrieve a partially completed loan application later in time by entering the potential borrower's social security number to complete the form.

A second portion of the set of borrower attributes of a potential borrower is acquired from at least one reporting agency or credit bureau (step 208). Referring to FIG. 1, the server 109 contacts the at least one credit bureaus 116 and 117 via the credit bureau interface 114. This interface may be a commonly available commercial software product that draws information directly from a credit bureau. Examples of presently existent credit bureaus include Experian, Equifax, and TransUnion. The credit bureau interface may be software provided by a credit bureau such as a product called "smart.alx". This interface collects information regarding the credit history of a potential borrower that has submitted a loan application.

With the first portion and the second portion of the borrower attributes thus accumulated, the borrower attributes are compared to all of the loan acceptance criteria stored in the database 110 to determine any available loans for the potential borrower (step 210). For the loan acceptance criteria elements as illustrated in FIG. 3A and FIG. 3B, borrower attributes of loan product type, geography, demographics, and collateral are compared to the information as entered by the potential borrower. Borrower attributes of credit limit, credit utilization, payment performance, judgments, and credit score are compared to the information as provided by at least one credit bureau.

If the borrower attributes provided by the potential borrower and the credit bureau are within the loan acceptance criteria as specified by the lender for an offered loan, then that loan is available to the potential borrower. On the other hand, if the borrower attributes are outside the loan acceptance criteria, then that loan is not available to the potential borrower. A set of all available loans is determined by comparing the borrower attributes against all loan acceptance criteria stored in database 110.

With the available loans determined, those available loans are ranked by analyzing the respective loan attributes for each available loan. A first ranking of best loans is determined for each individual loan attribute (step 212). Referring to FIG. 6, a ranking of best loans 600 is displayed on a consumer screen 650 of a consumer terminal. This ranking includes, a best loan for the lowest APR in a first column 602, for the lowest current interest rate in a second column 604, for the lowest fixed interest rate in a third column 606, for the lowest total origination cost in a fourth column 608, for the highest credit limit in a fifth column 610, and for the lowest minimum monthly payment in a sixth column 612.

A second ranking of best loans is determined from a respective composite score for each available loan by weighting each of the loan attributes (step 214). The best loan having a highest weighted composite score is displayed in a seventh column 614 of FIG. 6. Each loan attribute is weighted with a respective weighting factor. The respective weighting factor may be a respective predetermined fixed value that is a default value. Alternatively, each of the weighting factors may be specified by the potential borrower depending on the importance of each of the loan attributes to the potential borrower.

The rankings of best loans are displayed to the potential borrower on the screen 650 of a consumer terminal (step 218). Alternatively the rankings of best loans may also be displayed in a list form further including the second and third best loans in addition to the first best loan.

From the rankings of best loans, the potential borrower chooses a selected loan provided by a selected lender (step 218). The selected loan depends on which loan attributes are most important to the potential borrower. In the case of one lender providing all of the offered loans, the selected lender is always that one lender.

Referring to FIG. 7, a selected lender display 700 is shown on a consumer screen 750 of a consumer terminal. This display shows information regarding the selected loan and the selected lender. This information includes the lender's name, phone number, address, and contact name, and the loan attributes of the selected loan. The selected lender display 700 asks the potential borrower at the bottom of the display 702 if a loan application should be submitted to this lender for the purpose of consummating the loan transaction. If the potential borrower responds with a "Y" for "yes", the loan origination system of the present invention automatically generates a loan application from the borrower attributes of the potential borrower (step 220). This loan application is then sent via the global telecommunications network to that lender for loan approval (step 222).

When this lender receives this loan application, the lender will complete the loan underwriting process to decide whether to provide a loan to the potential borrower. A lender may view loan applications in process with that lender via an applications in line display 800 of FIG. 8. This display is on a lender screen 850 of a lender terminal.

In this manner, the present invention greatly aids in loan access to any potential borrower in the loan market. With the automatic matching process of the present invention occurring at a centralized location on the global telecommunications network, the amount of time and effort a lender must employ to provide a best available credit program to a potential borrower is significantly reduced. Correspondingly, the amount of time any potential borrower must wait for loan approval is also significantly reduced. By automatically matching potential borrowers with the best available loan, across a single lender, an affiliation of lenders, or an plurality of lenders, the potential borrower acquires a loan with the most favorable interest rate and terms and in a convenient manner.

Moreover, the automatic matching process enables lenders to use larger and more complex sets of loan acceptance criteria in matching loans with potential borrowers. For example, each potential borrower having a corresponding default risk may be more precisely matched to appropriate loan terms for that default risk. This better alignment of loan terms to the qualifications for credit of a potential borrower enables lenders to have "risk-based-pricing." Thus, lenders will be able to precisely scale loan attributes to the borrower's attributes rather than offering a limited number of loans appropriate for the "average borrower" within a relatively unsegmented population of borrowers. The ability of lenders to maintain more loans may also make loans available to borrowers who previously could not meet the more limited set of loan acceptance criteria.

Furthermore, the automatic filtering and ranking of available loans provided by any lender allows lenders to present to the borrower a choice of loans that are of most interest to the potential borrower. The potential borrower specifies the loan attributes that are most important to that potential borrower. The lender then presents the loans having the most favorable loan attributes as specified by the potential borrower.

The present invention also aids lenders in acquiring information about the loan market. The flowchart of FIG. 9 includes steps for thus aiding a lender requesting such information. A lender inputs specified loan acceptance criteria (step 902) via a lender terminal. This information is sent via the global telecommunications network 108 to the server terminal 109. The specified loan acceptance criteria may be specifications for any of the borrower attributes of FIGS. 3A and 3B.

The lender is provided with information about the borrowers or other lenders in the loan market. The other lenders may include unrelated lenders, affiliates, or even other branches of that lender. Regarding other lenders, the lender is provided information such as loan attributes of competitive loan offers provided by other lenders who also require similar specified loan acceptance criteria (step 902). This information about other competitive loan offers enables the informed lender to provide more competitive loan offers. Thus, a lender does not waste effort and time in offering loans with loan attributes that are unprofitable or uncompetitive.

Figure 9:
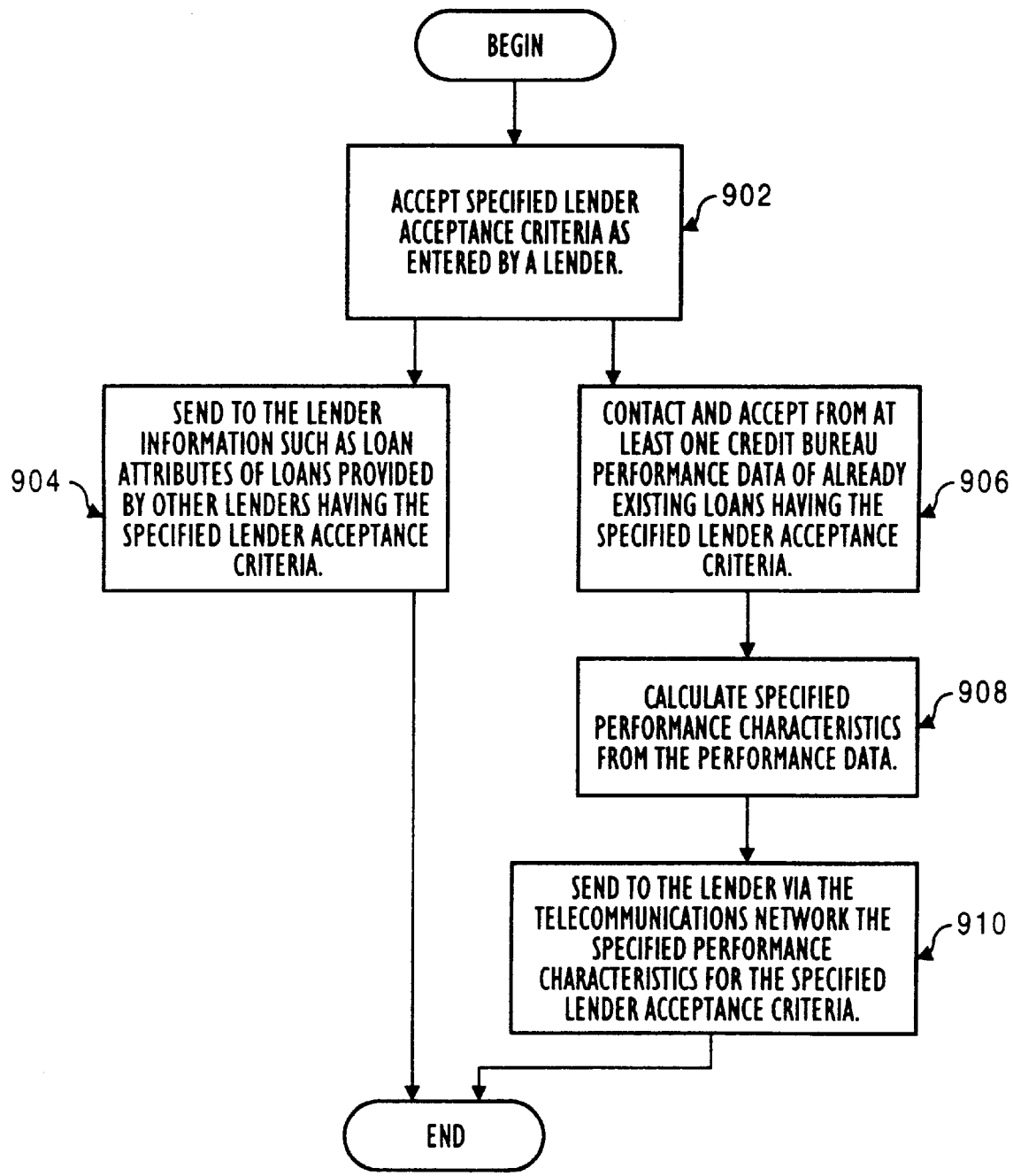
FIG. 9 shows a flowchart of steps for providing information to a lender regarding the loan market.

Regarding the borrowers of the loan market, the lender is provided information about the performance of past and existing borrowers having borrower attributes within the specified loan acceptance criteria. Referring to FIGS. 1 and 9, after the registered lender inputs specified loan acceptance criteria at step 902, the data processor 112 controls the credit bureau interface 114 to contact at least one credit bureau (step 906). The credit bureau sends performance data of already existing loans having borrowers with borrower attributes within the specified loan acceptance criteria. This performance data is stored in database 110 of FIG. 1.

From this performance data, performance characteristics of such borrowers are calculated (step 908). A borrower performance display 1000 of FIG. 10 is on a lender screen 1050 of a lender terminal. This display includes information regarding such borrowers for loans that have been originated from a first specified date 1002 to a second specified date 1004. The performance characteristics that are calculated and shown include the percentage of loans having such borrowers, that are still remaining, at a first row 1006, the percentage of such loans that have been delinquent for at least 30, 60, or 90 days, at second, third, and fourth rows 1008, 1010, and 1012 respectively, and the percentage of such loans that have been charged off by the lender, at a fifth row 1014. These percentages are calculated in terms of both the number of loans and the dollar value of loans. Such a borrower performance display 1000 is sent for display on the lender screen 1050 of a lender terminal (step 910).

In the case only one lender is using the loan origination system of the present invention, that one lender may acquire information regarding offered loans and borrower performance characteristics of loans provided within that one lender. Alternatively, in the case an affiliation of lenders is using this loan origination system, that affiliation of lenders may acquire information regarding offered loans and borrower performance characteristics of loans provided within that affiliation of lenders.

In this manner, the lender is easily informed of the performance of borrowers with borrower attributes within the specified loan acceptance criteria. With this information, the lender makes a more informed decision on whether to provide a loan to borrowers having such borrower attributes and also what loan attributes to offer to potential borrowers having such borrower attributes.

The lender is then conveniently and fully informed of both the borrowers and the other lenders in the loan market. Thus, the lender makes decisions on proper loan attributes upon actual market data. A lender is thus further ensured that future loans will be repaid. Conversely, borrowers are ensured that they pay interest commensurate with only the risk of default the borrower presents to the lender.

The forgoing is by way of example only and is not intended to be limiting. For instance, the list of borrower attributes in the loan acceptance criteria of FIGS. 3A and 3B are by way of example only and may include other borrower attributes. In addition, the table of loan attributes 400 of FIG. 4, the loan application form 500 of FIG. 5, the ranking of best loans display 600 of FIG. 6, the selected lender display 700 of FIG. 7, the applications in line display 800 of FIG. 8, and the borrower performance characteristics display 1000 of FIG. 10 are also by way of example only and may have other appearances that convey similar information. In addition, in the flowcharts of FIGS. 2A and 2B, borrower attributes and loan acceptance criteria may be constantly updated by existing potential borrowers and lenders or by new potential borrowers and lenders at any point in the operation of the loan origination system of the present invention. The programming languages, software platforms and Internet browsers mentioned in the detailed description of the preferred embodiment is by way of example only, and the present invention may always be enhanced to incorporate the most advanced available technology. The invention is limited only as defined in the following claims and equivalents thereof.

We claim:

1. An apparatus for automatically matching a best available loan to a potential borrower having borrower attributes, via a global telecommunications network, the apparatus comprising:

a consumer terminal, operatively coupled to the global telecommunications network, for accepting a first portion of borrower attributes entered by the potential borrower into the consumer terminal; and a server terminal, operatively coupled to the global telecommunications network, the server terminal including:

a database for storing the first portion of the borrower attributes sent to the server terminal by the consumer terminal via the global telecommunications network, and for storing a second portion of the borrower attributes provided by a credit bureau, and for storing a respective loan acceptance criteria and respective loan attributes for each loan that is potentially available to the potential borrower; and a data processor for comparing the borrower attributes with each of the respective loan acceptance criteria stored in the database to determine any available loans, and for determining a ranking of best loans among the available loans depending on the respective loan attributes of each available loan, and wherein the server terminal is located with an affiliation of lenders and wherein each of the at least one loan is provided by the affiliation of lenders.

2. An apparatus for automatically matching a best available loan to a potential borrower having borrower attributes, via a global telecommunications network, the apparatus comprising:

a consumer terminal, operatively coupled to the global telecommunications network, for accepting a first portion of borrower attributes entered by the potential borrower into the consumer terminal;

a server terminal, operatively coupled to the global telecommunications network, the server terminal including:

a database for storing the first portion of the borrower attributes sent to the server terminal by the consumer terminal via the global telecommunications network, and for storing a second portion of the borrower attributes provided by a credit bureau, and for storing a respective loan acceptance criteria and respective loan attributes for each loan that is potentially available to the potential borrower; and a data processor for comparing the borrower attributes with each of the respective loan acceptance criteria stored in the database to determine any available loans, and for determining a ranking of best loans among the available loans depending on the respective loan attributes of each available loan; and a respective lender terminal, for each of a plurality of lenders, operatively connected to the global telecommunications network for accepting a respective loan acceptance criteria and respective loan attributes for each loan provided by each of the lenders and for sending the respective loan acceptance criteria and the respective loan attributes to the database via the global telecommunications network.

3. An apparatus for automatically matching a best available loan to a potential borrower having borrower attributes, via a global telecommunications network, the apparatus comprising:

means for accepting and sending a first portion of the borrower attributes entered by the potential borrower, via the global telecommunications network;

means for accepting a second portion of the borrower attributes sent from at least one credit bureau;

means for storing the borrower attributes;

means for storing a respective loan acceptance criteria and respective loan attributes for each of at least one loan that is potentially available to the potential borrower;

means for comparing the borrower attributes with each of the loan acceptance criteria to determine any available loans for the potential borrower;

means for determining a ranking of best loans among the available loans depending on the respective loan attributes of each available loan; and means for accepting a respective loan acceptance criteria and respective loan attributes for each loan provided by each of a plurality of lenders via the global telecommunications network.

4. A method for automatically matching a best loan to a potential borrower having borrower attributes, via a global telecommunications network, the method comprising the steps of:

A. accepting a first portion of the borrower attributes entered by the potential borrower, via the global telecommunications network into a database;

B. accepting a second portion of the borrower attributes sent by a credit bureau into the database;

C. storing into the database a respective loan acceptance criteria and respective loan attributes for at least one loan that is potentially available to the potential borrower;

D. comparing the set of borrower attributes with each of the loan acceptance criteria stored in the database to determine any available loans for the potential borrower;

E. determining a ranking of best loans among the available loans depending on the respective loan attributes of each available loan; and F. accepting a respective loan acceptance criteria and respective loan attributes for each loan provided by each of a plurality of lenders via the global telecommunications network.

5. A method for automatically matching a best loan to a potential borrower having borrower attributes, via a global telecommunications network, the method comprising the steps of:

A. accepting a first portion of the borrower attributes entered by the potential borrower, via the global telecommunications network into a database;

B. accepting a second portion of the borrower attributes sent by a credit bureau into the database;

C. storing into the database a respective loan acceptance criteria and respective loan attributes for at least one loan that is potentially available to the potential borrower;

D. comparing the set of borrower attributes with each of the loan acceptance criteria stored in the database to determine any available loans for the potential borrower;

E. determining a ranking of best loans among the available loans depending on the respective loan attributes of each available loan;

F. sending information via the global telecommunications network to a registered lender regarding borrower performance for specified loan acceptance criteria as entered by the registered lender; and G. sending information via the global telecommunications network to a registered lender regarding loan attributes provided by other registered lenders also having the specified loan acceptance criteria.

6. The apparatus of claim 1, wherein the consumer terminal accepts a selected loan provided by a selected lender as chosen by the potential borrower from the ranking of best loans, and wherein the data processor generates a loan application from the borrower attributes and sends the loan application via the global telecommunications network to the selected lender for loan approval.

7. The apparatus of claim 1, further comprising:

a screen on the consumer terminal for displaying the ranking of best loans to the potential borrower, via the global telecommunications network.

8. The apparatus of claim 1, further comprising:

a web-page that is down-loaded via the global telecommunications network which is the Internet to the consumer terminal, for allowing entry of the first portion of the borrower attributes by the potential borrower.

9. The apparatus of claim 1, further comprising:

a credit bureau interface, disposed on the server terminal, for acquiring the second portion of the borrower attributes from at least one credit bureau.

10. The apparatus of claim 1, wherein the processor determines a first ranking of best loans for each loan attribute.

11. The apparatus of claim 1, wherein the processor determines a second ranking of best loans from a respective composite score from a weighting of each loan attribute for each available loan.

12. The apparatus of claim 11, wherein the weighting of the loan attributes includes a respective weighting factor for each loan attribute that is a predetermined default value.

13. The apparatus of claim 11, wherein the weighting of the loan attributes includes a respective weighting factor that is selected by the potential borrower for each loan attribute.

14. The apparatus of claim 1, wherein the database stores a respective weighting factor for each element of the respective loan acceptance criteria, and wherein the data processor uses an overall weighting score in determining any available loans.

15. The apparatus of claim 2, wherein the consumer terminal accepts a selected loan provided by a selected lender as chosen by the potential borrower from the ranking of best loans, and wherein the data processor generates a loan application from the borrower attributes and sends the loan application via the global telecommunications network to the selected lender for loan approval.

16. The apparatus of claim 2, further comprising:
a screen on the consumer terminal for displaying the ranking of best loans to the potential borrower, via the global telecommunications network.

17. The apparatus of claim 2, further comprising:
a web-page that is down-loaded via the global telecommunications network which is the Internet to the consumer terminal, for allowing entry of the first portion of the borrower attributes by the potential borrower.

18. The apparatus of claim 2, further comprising:
a credit bureau interface, disposed on the server terminal, for acquiring the second portion of the borrower attributes from at least one credit bureau.

19. The apparatus of claim 2, wherein the processor determines a first ranking of best loans for each loan attribute.

20. The apparatus of claim 2, wherein the processor determines a second ranking of best loans from a respective composite score from a weighting of each loan attribute for each available loan.

21. The apparatus of claim 20, wherein the weighting of the loan attributes includes a respective weighting factor for each loan attribute that is a predetermined default value.

22. The apparatus of claim 20, wherein the weighting of the loan attributes includes a respective weighting factor that is selected by the potential borrower for each loan attribute.

23. The apparatus of claim 2, wherein the database stores a respective weighting factor for each element of the respective loan acceptance criteria, and wherein the data processor uses an overall weighting score in determining any available loans.

24. The apparatus of claim 3, further comprising:
means for accepting a selected loan provided by a selected lender as chosen by the potential borrower from the ranking of best loans; and
means for generating a loan application from the borrower attributes and for sending the loan application via the global telecommunications network to the selected lender for loan approval.

25. The apparatus of claim 3, wherein each of the at least one loan is provided by an affiliation of lenders.

26. The apparatus of claim 3, further comprising:
means for displaying the ranking of best loans to the potential borrower via the global telecommunications network.

27. The method of claim 4, further including the steps of:
accepting a selected loan provided by a selected lender as chosen by the potential borrower from the ranking of best loans; and
generating a loan application from the borrower attributes and sending the loan application via the global telecommunications network to the selected lender for loan approval.

28. The method of claim 4, further including the step of:
displaying the ranking of best loans to the potential borrower via the global telecommunications network.

29. The method of claim 4, wherein step A further includes the step of:
downloading a web-page via the global telecommunications network to a terminal of the potential borrower, for allowing entry of the first portion of the borrower attributes by the potential borrower.

30. The method of claim 4, wherein step E further includes the step of:
determining a first ranking of best loan for each of the loan attributes.

31. The method of claim 4, wherein step E further includes the step of:
determining a second ranking of best loans from a respective composite score from a weighting of the respective loan attributes for each of the available loans.

32. The method of claim 3, wherein the weighting of the loan attributes includes a respective weighting factor for each loan attribute that is a predetermined default value.

33. The method of claim 31, wherein the weighting of the loan attributes includes a respective weighting factor that is selected by the potential borrower for each loan attribute.

34. The method of claim 31, wherein step C includes the step of storing into the database a respective weighting factor for each element of the respective loan acceptance criteria, and wherein step D includes using an overall weighting score in determining any available loans.

35. The method of claim 4, further comprising the step of:
sending information via the global telecommunications network to a registered lender regarding borrower performance for specified loan acceptance criteria as entered by the registered lender.

36. The method of claim 4, further including the steps of:
accepting the specified loan acceptance criteria as entered by the registered lender;
accepting performance data of existing loans having lenders with the specified loan acceptance criteria, sent from at least one credit bureau;
calculating specified performance characteristics from the performance data; and
sending the specified performance characteristics to the registered lender via the global telecommunications network.

37. The method of claim 5, further including the steps of:
accepting a selected loan provided by a selected lender as chosen by the potential borrower from the ranking of best loans; and
generating a loan application from the borrower attributes and sending the loan application via the global telecommunications network to the selected lender for loan approval.

38. The method of claim 5, wherein each of the at least one loan is provided by one lender.

39. The method of claim 5, wherein each of the at least one loan is provided by an affiliation of lenders.

40. The method of claim 5, further including the step of:
accepting a respective loan acceptance criteria and respective loan attributes for each loan provided by each of a plurality of lenders via the global telecommunications network.

41. The method of claim 5, further including the step of:
displaying the ranking of best loans to the potential borrower via the global telecommunications network.

42. The method of claim 5, wherein step A further includes the step of:
downloading a web-page via the global telecommunications network to a terminal of the potential borrower, for allowing entry of the first portion of the borrower attributes by the potential borrower.

43. The method of claim 5, wherein step E further includes the step of:
determining a first ranking of best loan for each of the loan attributes.

44. The method of claim 5, wherein step E further includes the step of:

determining a second ranking of best loans from a respective composite score from a weighting of the respective loan attributes for each of the available loans.

45. The method of claim 44, wherein the weighting of the loan attributes includes a respective weighting factor for each loan attribute that is a predetermined default value.

46. The method of claim 44, wherein the weighting of the loan attributes includes a respective weighting factor that is selected by the potential borrower for each loan attribute.

47. The method of claim 5, wherein step C includes the step of storing into the database a respective weighting factor for each element of the respective loan acceptance criteria, and wherein step D includes using an overall weighting score in determining any available loans.

48. The method of claim 5, further including the steps of:

accepting the specified loan acceptance criteria as entered by the registered lender;

accepting performance data of existing loans having lenders with the specified loan acceptance criteria, sent from at least one credit bureau;

calculating specified performance characteristics from the performance data; and sending the specified performance characteristics to the registered lender via the global telecommunications network.

* * * * *